Figure 1:
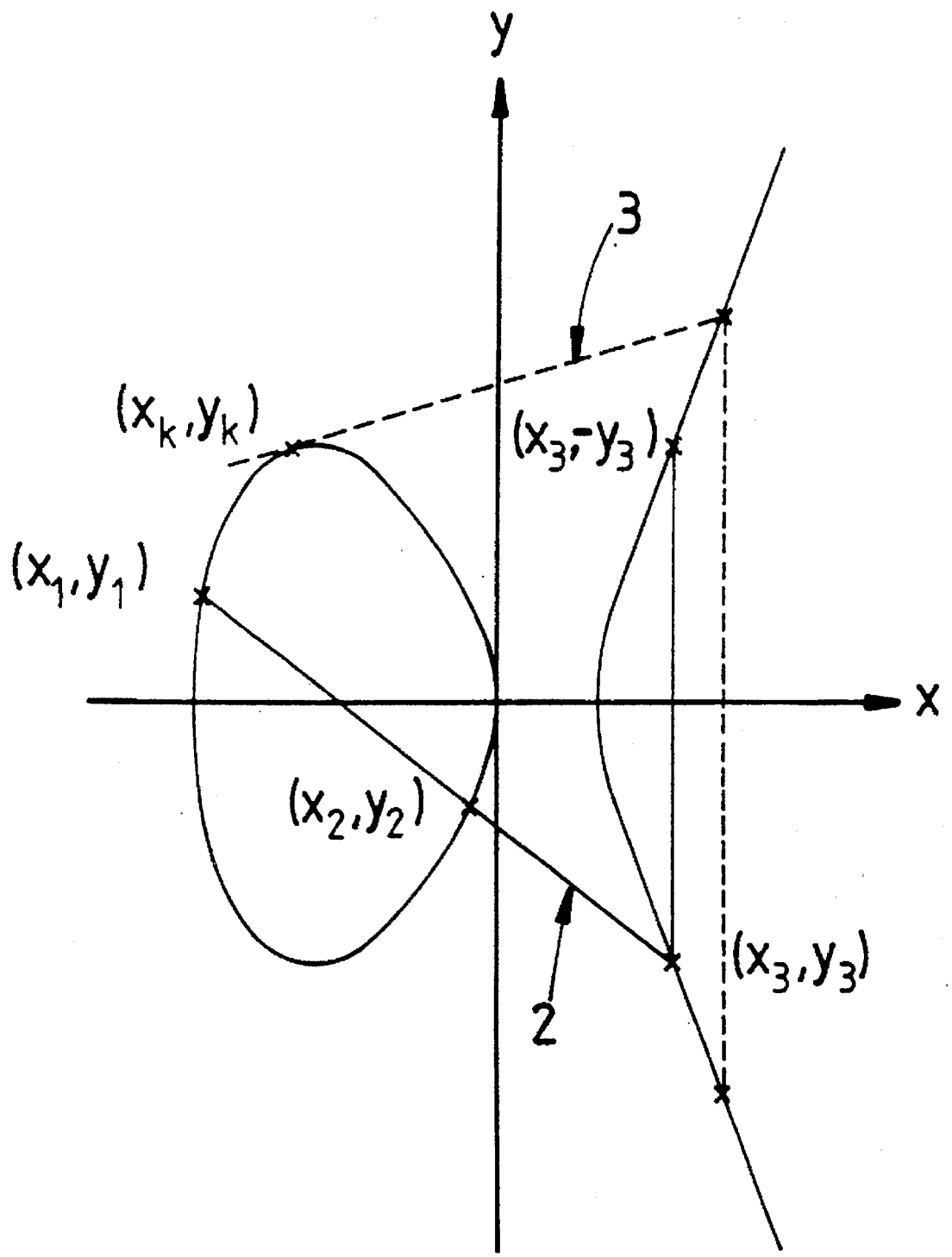

United States Patent [19]

Demytko

[11] Patent Number: 5,627,893
[45] Date of Patent: May 6, 1997

[54] CRYPTOGRAPHIC METHOD

[75] Inventor: Nicholas Demytko, Mentone, Australia

[73] Assignee: Telstra Corporation Limited, Melbourne, Australia

[21] Appl. No.: 446,816

[22] PCT Filed: Dec. 20, 1993

[86] PCT No.: PCT/AU93/00665

§ 371 Date: Jul. 24, 1995

§ 102(e) Date: Jul. 24, 1995

[87] PCT Pub. No.: WO94/15423

PCT Pub. Date: Jul. 7, 1994

[30] Foreign Application Priority Data

Dec. 22, 1992 [AU] Australia .............. PL6502/92

[51] Int. Cl.⁶ ........................................ H04L 9/26
[52] U.S. Cl. .............................. 380/30; 380/28; 380/23
[58] Field of Search ........................... 380/30, 28, 23

[56] References Cited

U.S. PATENT DOCUMENTS

| | | | |
|---|---|---|---|
| 4,933,970 | 6/1990 | Shamir | 380/30 |
| 4,935,962 | 6/1990 | Austin | 380/25 |
| 4,944,007 | 7/1990 | Austin | 380/21 |
| 5,146,500 | 9/1992 | Maurer | 380/30 |
| 5,159,632 | 10/1992 | Crandall | 380/30 |
| 5,272,755 | 12/1993 | Miyaji et al. | 380/30 |

FOREIGN PATENT DOCUMENTS

| | | |
|---|---|---|
| 3905824A1 | 11/1989 | Germany. |
| 63-217739 | 9/1988 | Japan. |
| WO92/14318 | 8/1992 | WIPO. |

*Primary Examiner*—David S. Cain
*Attorney, Agent, or Firm*—Thomas J. Engellenner; Anthony A. Laurentano; Lahive & Cockfield

[57] ABSTRACT

A cryptographic method including selecting secret keys p and q, being prime numbers greater than 3, selecting public parameters for a series of data values which belong to one of a plurality of pairs of groups whereby any one of the data values in one of the pairs of groups is recovered by performing an operation $kN_i+1$ times modulo n beginning with the any one of the data values, where k is an integer, $N_i$ is the order of the ith pair of groups and n=p.q, selecting a public encryption key e which is a factor of $kN_i+1$ for all i, and processing communications data as a member of one of the pairs of groups by performing the operation on the communications data, whereby the order $N_i$ of the pair of groups i that the communications data belongs to can be determined on the basis of p and q, and a secret decryption key $d_i$ can be determined using $e.d_i=kN_i+1$.

23 Claims, 1 Drawing Sheet

CRYPTOGRAPHIC METHOD

The present invention relates to cryptology and, in particular, to a cryptographic method which can be used for public key encryption and to produce digital signatures.

Cryptographic techniques have become of significant practical importance in the area of digital communications, particularly with the increasing prevalence of digital telecommunications networks. Development has concentrated on schemes which allow message data, often referred to as plaintext, to be encrypted using a key which is available to the public, to produce ciphertext which can only be decrypted using a secret key that is related to the public key but which cannot be derived therefrom. Schemes of this nature were first discussed in W. Diffie and M. E. Hellman, "New Directions in Cryptography", IEEE Transactions on Information Theory, Vol. 22, No. 6, 1976, pp. 644–654, and the first practical implementation was proposed in R. L. Rivest, A. Shamir and L. Adeleman, "A Method for Obtaining Digital Signatures and Public-Key Cryptosystems", Communications of the ACM, Vol. 21, No. 2, 1978, pp. 120–126, and is known as RSA. The schemes can also be used to produce digital signatures, where the plaintext can be signed by encrypting with the secret key, and then read using the public key.

The cryptographic operations performed on the ciphertext and plaintext are best described and defined using mathematical formula and symbols that depict the cryptographic process as being a sequence of mathematical operations on the numerical value represented by the bits of the data forming the plaintext or ciphertext. RSA, for example, involves a sequence of operations which are performed in modulo n arithmetic, where n is part of the public key and is the product of two large primes p and q, that constitute the secret key. The security of RSA relies primarily on the difficulty of factoring the composite number n. Although relatively secure and simple to implement, RSA is susceptible to homomorphic attack, where valid digital signatures can be produced from the combination of previously signed messages that have been recorded.

Elliptic curves over finite fields have also been found to be applicable to cryptology where the points on a curve can form a group and where an initial point can be used to derive other points in the group in a cyclical manner until the initial point of the curve is obtained again. The plaintext can be made a coordinate of a point on an elliptic curve and encrypted by performing the operations on the point to move it to another point within the group. The message can only be retrieved by knowing the characteristics of the curve and the order of the group to which the plaintext belongs. The elliptic curve operations are also performed modulo n, where n is the product of two large primes p and q. The first elliptic curve based scheme which is analogous to RSA is proposed in K. Koyama, U. M. Maurer, T. Okamoto and S. A. Vanstone, "New Public-Key Schemes based on Elliptic Curves over the Ring Zn", CRYPTO '91 Abstracts, Santa Barbara, Calif., pp. 6-1 to 6-7, 11–15 August, 1991. The paper essentially describes two schemes, discussed hereinafter, which can be used for the same applications as RSA, one can only be used to produce digital signatures, while the second scheme can also be used for public key encryption. The latter scheme, however, is restricted in the types of primes, p and q, and the types of elliptic curves which can be used, and a second coordinate needs to be transmitted with the ciphertext to enable decryption. The first scheme has the disadvantages that the digital signatures are roughly twice as long as the message or plaintext and that trial and error is required to locate a point on the elliptic curve corresponding to a plaintext, which involves incrementing the value x of the plaintext.

In accordance with the present invention there is provided a cryptographic method including:

selecting secret keys p and q, being prime numbers greater than 3;

selecting public parameters for a series of data values which belong to one of a plurality of pairs of groups whereby any one of said data values in one of said pairs of groups is recovered by performing an operation $kN_i+1$ times modulo n beginning with said any one of said data values, where k is an integer, $N_i$ is the order of the ith pair of groups and n=p.q;

selecting a public encryption key e which is a factor of $kN_i+1$ for all i; and processing communications data as a member of one of said pairs of groups by performing said operation on said communications data, whereby the order $N_i$ of the pair of groups i that said communications data belongs to can be determined on the basis of p and q, and a secret decryption key $d_i$ can be determined using $e.d_i=kN_i+1$.

A preferred embodiment of the present invention is hereinafter described, by way of example only, with reference to the accompanying drawing, wherein:

FIG. 1 is a diagram of an elliptic curve used in a preferred embodiment of a cryptographic method.

The preferred embodiment involves operations based on the elliptic curve $$y^2 = x^3 + ax + b \qquad (1)$$

where a and b are constants chosen so that $$4a^3 + 27b^2 \neq 0 \qquad (2)$$

which ensures that the cubic equation $$z = x^3 + ax + b \qquad (3)$$

has three distinct roots. The graph of the curve is as shown in FIG. 1 if Equation 1 has three real roots. The curve has the property that if a non-vertical line 2 intersects it at two rational points $(x_1, y_1)$ and $(x_2, y_2)$ then a third rational point of intersection $(x_3, y_3)$ will exist. A tangent 3 to the curve is considered to have a double point of intersection $(x_k, y_k)$ at the point of tangency. If two points $(x_1, y_1)$ and $(x_2, Y_2)$ are known then the third point of intersection $(x_3, y_3)$ can be obtained by the following $$x_3 = \lambda^2 - x_1 - x_2 \qquad (4)$$

$$y_3 = \lambda \times (x_3 - x_1) + y_1 \qquad (5)$$

where if $x_1 \neq x_2$ then $$\lambda = \frac{y_1 - y_2}{x_1 - x_2} \qquad (6)$$

and if $x_1 = x_2$ then $$\lambda = \frac{3x_1^2 + a}{2y_1} \qquad (7)$$

$\lambda$ being the slope of the line connecting the points.

Using the curve an "addition" operation can be defined where $$(x_1,y_1)+(x_2,y_2)=(x_3,-y_3) \qquad (8)$$

The sum of the two intersecting points does not give the third intersection point but in fact gives the reflection across the x-axis of the third intersection point $(x_3,y_3)$, as shown in FIG. 1. To form a group of points for which every straight line which intersects the curve at two points also intersects at a third, an identity $\infty$ is defined for the addition operation $$(x,y)+(x,-y)=(x,-y)+(x,y)=\infty \qquad (9)$$

The point $\infty$ can be though of as a point infinitely distant from the curve so that every vertical line passes through the point.

E(a,b) can be used to denote the group of rational points on the curve for a given a,b, including the point $\infty$. Rational points can be derived from one another using the addition operation.

The above arithmetic operations also apply if performed modulo p where p is a prime number larger than 3 and a and b are integers chosen such that $$4a^3+27b^2 \not\equiv 0 \ (mod \ p) \qquad (10)$$

$E_p(a,b)$ can then be used to denote an elliptic curve group modulo p having elements (x,y) which are pairs of non-negative integers less than p which satisfy $$y^2 \equiv x^3+ax+b (mod \ p) \qquad (11)$$

The group includes the identity $\infty$, and the points in the group can be derived from one another using the addition operation. The modulo p curve of Equation 11 would of course be a discontinuous form of that illustrated in FIG. 1. A third point on the curve, $R=(x_3, y_3)$, can be derived by adding two other points of the group, $P=(x_1,y_1)$ and $Q=(x_2, y_2)$, using the following $$x_3 \equiv \lambda^2 - x_1 - x_2 \ (mod \ p) \qquad (12)$$

$$y_3 \equiv \lambda(x_1 - x_3) - y_1 \ (mod \ p) \qquad (13)$$

where $$\lambda \equiv \begin{cases} \dfrac{y_1-y_2}{x_1-x_2} & \text{if } x_1 \equiv x_2 \ (mod \ p) \\ \dfrac{3x_1^2+a}{2y_1} & \text{if } x_1 \equiv x_2 \text{ and } y_1 \equiv -y_2 \ (mod \ p) \end{cases} \qquad (14)$$

The identity element is defined such that if $x_1 \equiv x_2$ and $y_1 \equiv -y_2$ (mod p), then $P+Q=\infty$, i.e., $P=-Q$ or $(x_2,-y_2)\equiv-(x_2, y_2)$ (mod p). The $-$ symbol before a point in the group denotes the inverse of that point.

A point can be added to itself using the addition operation a number of times, i, to produce other points in the group. This is denoted as $$(x_i, y_i) \equiv (x_1, y_1) \# i (mod \ p) \qquad (15)$$

where $(x_i,y_i)$ is the ith point derived from the point $(x_1,y_1)$. The # operation is often referred to as multiplication, i.e., the point $(x_i, y_i)$ is the result of multiplying the point $(x_1,y_1)$ by i. Efficient methods, as discussed hereinafter, are available to perform this multiplication, for large values of i, by performing a chain of addition operations on ascending pairs of points in the group.

For example, $(x_2, y_2)$ can be obtained by treating $(x_1, y_1)$ as a double point or point tangency and adding it onto itself. Then $(x_4,y_4)$ can be obtained by adding $(x_2,y_2)$ onto itself, and $(x_3,y_3)$ can be obtained by adding $(x_2,y_2)$ onto $(x_1, y_1)$ and $(x_6, y_6)$, can be obtained by adding $(x_3,y_3)$ onto $(x_3, y_3)$ and so on.

If i equals the order of the group, the resulting point is the identity, $\infty$. If i is one more than the order of the group the resulting point is the original point $(x_1,y_1)$, i.e., the group has the property that $P+\infty=\infty+P=P$.

The elliptic curve cryptographic method relies on knowing the order of or number of points in $E_p(a,b)$. The order can be evaluated by observing that for a given value of x, if $x^3+ax+b$ is a quadratic residue, i.e., possesses a square root modulo p, then there are two values of y that correspond to x, if $x^3+ax+b$ is divisible by p, then there is only one value of y that corresponds to that x, and otherwise there are no values of y that correspond to that x. Taking also into account the point at $\infty$, the order of the group, denoted $|E_p(a,b)|N_p$, is given by:

$$N_p = |E_p(a, b)| = 1 + \sum_{x=1}^{p} \left( \left( \frac{z}{p} \right) + 1 \right) \qquad (16)$$

where (z |P) is the Legendre symbol and $z \equiv x^3+ax+b$ (mod p). The Legendre symbol is an operation performed using modulo arithmetic, in this case modulo p, to determine whether a number, in this case z, possesses a quadratic residue or not. The operation produces the value of $\pm 1$ or 0, 1 if the number is a quadratic residue, $-1$ if it is a quadratic non-residue and 0 if it is divisible by the modulus, p.

As an example, if p=5, and a=b=$-$1, the points of $E_5$ ($-$1, $-$1) must satisfy $$y^2 \equiv x^3-x-1 (mod \ 5) \qquad (17)$$

The coordinate x is not allowed to equal 3 as 23 is not a quadratic residue modulo 5. The elements of the group are

| | | | | | |
|---|---|---|---|---|---|
| (0,2), | (1,2), | (2,0), | (4,2), | | |
| (0,3), | (1,3), | | (4,3), | and | $\infty$ |

If $(x_1, y_1) = (0, 2)$, then

| | | | |
|---|---|---|---|
| $(x_2, y_2)$ | $= (0, 2) + (0, 2)$ | $\lambda = (3 \times 0 - 1) \times 4$ | $= 1 \ (mod \ 5),$ |
| | | $x_2 = 1 - 0 - 0$ | $= 1 \ (mod \ 5),$ |
| | | $-y_2 = 1 \times (1 - 0) + 2$ | $= 3 \ (mod \ 5),$ |
| | $= (1, 2);$ | | |
| $(x_3, y_3)$ | $= (1, 2) + (0, 2)$ | $\lambda = (2 - 2) \times 1$ | $= 0 \ (mod \ 5),$ |
| | | $x_3 = 0 - 1 - 0$ | $= 4 \ (mod \ 5),$ |
| | | $-y_3 = 0 \times (4 - 0) + 2$ | $= 2 \ (mod \ 5),$ |
| | $= (4, 3);$ | | |
| $(x_4, y_4)$ | $= (4, 3) + (0, 2)$ | $\lambda = (3 - 2) \times 4$ | $= 4 \ (mod \ 5),$ |
| | | $x_4 = 16 - 4 - 0$ | $= 2 \ (mod \ 5),$ |
| | | $-y_4 = 4 \times (2 - 0) + 2$ | $= 0 \ (mod \ 5),$ |
| | $= (2, 0);$ | | |
| $(x_5, y_5)$ | $= (2, 0) + (0, 2)$ | $\lambda = (0 - 2) \times 3$ | $= 4 \ (mod \ 5),$ |
| | | $x_5 = 16 - 2 - 0$ | $= 4 \ (mod \ 5),$ |
| | | $-y_5 = 4 \times (4 - 0) + 2$ | $= 3 \ (mod \ 5),$ |
| | $= (4, 2);$ | | |
| $(x_6, y_6)$ | $= (4, 2) + (0, 2)$ | $\lambda = (2 - 2) \times 4$ | $= 0 \ (mod \ 5),$ |
| | | $x_6 = 0 - 4 - 0$ | $= 1 \ (mod \ 5),$ |
| | | $-y_6 = 0 \times (1 - 0) + 2$ | $= 2 \ (mod \ 5),$ |
| | $= (1, 3);$ | | |
| $(x_7, y_7)$ | $= (1, 3) + (0, 2)$ | $\lambda = (3 - 2) \times 1$ | $= 1 \ (mod \ 5),$ |
| | | $x_7 = 1 - 1 - 0$ | $= 0 \ (mod \ 5),$ |
| | | $-y_7 = 1 \times (0 - 0) + 2$ | $= 2 \ (mod \ 5),$ |

$$(x_8, y_8) = (0, 3);$$
$$= (0, 3) + (0, 2) = \infty.$$

A practical technique for computing the order of an elliptic group modulo p for large p is discussed in A.K. Lenstra and H.W. Lenstra, Jnr., "Algorithms in Number Theory", University of Chicago, Department of Computer Science, Technical Report #87-008, 1987. Two particular cases using the technique are discussed in D. M. Bressoud, Factorisation and Primality Testing, Springer-Verlag, N.Y., 1989 and are as follows. The equations for the orders used in the two cases were proved by a mathematician, André Weil in 1952.

In the first case, if p is an ordinary prime which is congruent to 1 modulo 4, r is a complex prime that divides p and is congruent to 1 modulo 2+2i, and D is any integer not divisible by p then the order of $E_p(-D,0)$ is $$|E_p(-D,0)| = p+1-\left(\frac{D}{r}\right)_4 r - \left(\frac{D}{r}\right)_4 \bar{r} \quad (18)$$

where $(x/r)_4$ is the fourth power symbol and $\bar{r}$ is the conjugate of the complex integer r.

For example, if p=13 and r=3+2i, then $$|E_{13}(-1,0)|=14-(1)(3+2i)-(1)(3-2i)=8$$

$$|E_{13}(1,0)|=14-(-1)(3+2i)-(-1)(3-2i)=20$$

$$|E_{13}(-2,0)|=14-(i)(3+2i)-(-i)(3-2i)=18$$

$$E_{13}(2,0)|=14-(-i)(3+2i)-(i)(3-2i)=10$$

In the second case, if p is an ordinary prime which is congruent to 1 modulo 3, r is a cubic prime that divides p and is congruent to 2 modulo 3 and D is any integer not divisible by p then the order of $E_p(0,D)$ is $$|E_p(0,D)| = p+1+\left(\frac{4D}{r}\right)_6 r + \left(\frac{4D}{r}\right)_6 \bar{r} \quad (19)$$

where $(x|r)_6$ is the sixth power symbol and $\bar{r}$ is the conjugate of the cubic integer r.

For example, if p=13 and r=-4-3ω, where $\omega=e^{2\pi i/3}$, then $$|E_{13}(0,1)|=14+(\omega^2)(-4-3\omega)+(\omega)(-1+3\omega)=12$$

$$|E_{13}(0,2)|=14+(-1)(-4-3\omega)+(-1)(-1+3\omega)=19$$

$$|E_{13}(0,3)|=14+(1)(-4-3\omega)+(1)(-1+3\omega)=9$$

$$|E_{13}(0,4)|=14+(\omega)(-4-3\omega)+(\omega^2)(-1+3\omega)=21$$

$$|E_{13}(0,5)|=14+(-\omega^2)(-4-3\omega)+(-\omega)(-1+3\omega)=16$$

$$|E_{13}(0,6)|=14+(-\omega)(-4-3\omega)+(-\omega^2)(-1+3\omega)=7$$

It has also been shown that for every elliptic curve of Equation 11

$$|E_p(a,b)| = p+1+\alpha, \text{ where } |\alpha| \leq 2\sqrt{p} \quad (20)$$

The above illustrates that the order of the group $E_p(a,b)$ can be determined.

For the group Ep(a,b), the following applies $$(x_1, y_1)\#\{p+1+\alpha\}(mod\ p)=\infty \quad (21)$$

and therefore $$(x_1,y_1)\#\{m(p+1+\alpha)\pm1\}(mod\ p)=(x_1,\pm y_1) \quad (22)$$

where m is an arbitrary integer. Equation 22 includes a ± value as the group $E_p(a,b)$ is symmetrical about ∞ because 1 point past ∞, $(x_1,y_1)$ is obtained, whereas one point short of ∞, $(x_1,-y_1)$ is obtained, and only the plaintext $x_1$ is of interest. The term in { } of Equation 22 can be considered to be equal to e.d, where e constitutes an encryption key and d constitutes a decryption key. Therefore for encryption of a message or plaintext which has a value $x_1$ that is a coordinate of the point $(x_1, y_1)$ on the elliptic curve, the following encryption operation can be performed $$(x_e, y_e)\equiv(x_1,y_1)\#e(mod\ p) \quad (23)$$

The ciphertext $x_e$ can then be decrypted using $$(x_1,y_1)\equiv(x_e,y_e)\#d(mod\ p) \quad (24)$$

Also to apply a digital signature to the plaintext the following operation is executed $$(x_d,y_d)\equiv(x_1,y_1)\#d(mod\ p) \quad (25)$$

and then the signature can be validated by executing the following $$(x_1, y_1)\equiv(x_d,y_d)\#e(mod\ p) \quad (26)$$

Once the prime p is selected and the order of the group $E_p(a,b)$ is known, e is randomly selected and d can be determined according to the Equation 22 from the following $$e.d\equiv\pm1 mod(p+1+\alpha) \quad (27)$$

The same also applies for a group $E_q(a,b)$ based on another large prime q such that $$(x_1,y_1)\#\{k(q+1+\beta)+1\}(mod\ q)=(x_1,y_1) \quad (28)$$

where q+1+β is the order $N_q$ of the group $E_q(a,b)$, k is an arbitrary integer, and $|\beta|\leq 2\sqrt{q}$.

The points on $E_n(a,b)$, where n=p.q, can each be represented uniquely by a pair of the points of $E_p(a,b)$ and $E_q(a,b)$, according to the Chinese Remainder Theorem (CRT) for modulo arithmetic, therefore the encryption and decryption schemes of Equations 23 to 26 can be performed in modulo n, where n is made public and p and q are kept secret. Again, once e is selected d is then determined using $$e.d\equiv\pm1 mod(N_a) \quad (29)$$

where $N_a\equiv N_p N_q$ or $N_a=1cm(N_p,N_q)$ can only be determined if p and q are known, which enables $N_p$ and $N_q$ to be determined as shown previously.

Encryption and digital encryption schemes which use specific elliptic curve groups are discussed in K. Koyama, U.

M. Maurer, T. Okamoto and S. A. Vanstone, "New Public-Key Schemes based on Elliptic Curves over the Ring Zn", CRYPTO '91 Abstracts, Santa Barbara, Calif., pp. 6-1 to 6-7, 11-15 August, 1991. One of the schemes can be only used for digital signatures as both p and q need to be known to find a point on $E_a(a,b)$ which corresponds to the plaintext, because a square root modulo n needs to be found for $z \equiv y^2 \equiv (\text{mod } n)$. Also the plaintext generally needs to be incremented to find a value of x, representing the plaintext, which gives a z that is a quadratic residue modulo n. This can be a time consuming process as many values may have to be tried before a valid value can be found. The signature used in the scheme is also approximately twice as long as the original plaintext or message data. For the encryption schemes proposed in the paper, only odd primes can be used for p and q which satisfy $p \equiv q \equiv 2 \pmod 3$ or $p \equiv q \equiv 3 \pmod 4$. This restricts the orders of the groups used to p+1 and q+1, which cannot be changed. The schemes do not allow for use of general elliptic groups $E_p(a,b)$ and $E_q(a,b)$ for which the order of these groups can be determined. Also both coordinates (x,y) need to be specified during the encryption process and sent to a receiver. This enables the sender and receiver to determine the curve on which the encryption process is operating, as the curve used is not the same for each message, because the constraints discussed above require a curve and message to be fitted to one another for each message.

The preferred embodiment of the present invention provides a cryptographic method which fixes the curve used by allowing the plaintext x to represent a coordinate of a point (x,y) where y is indeterminant for the field of the curve for non-negative integer values of x. This first requires the creation and definition of a complimentary group, as discussed below, for the elliptic curve modulo p.

For the complimentary group, p is a prime, greater than 3, and again, a and b are chosen so that Equation 10 holds. The group is denoted by $\overline{E_p(a,b)}$ and its elements (x,y) satisfy Equation 11 but y is indeterminant for non-negative integer values of x. The indeterminant coordinate y is considered to be of the form $y = u\sqrt{v}$ where u is a non-negative integer less than p and v is a fixed quadratic non-residue modulo p. The identity element $\infty$ and the addition operation are identical to those described previously for the standard group $E_p(a,b)$.

In the complimentary group if $P=(x_1,y_1)=(x_1, u_1\sqrt{v})$ and $/Q=(x_2, y_2)=(x_2, u_2\sqrt{v})$ are two elements in the group, then $R=(x_3,y_3)=(x_3, u_3\sqrt{v})$ is also in the group, i.e., $$(x_1,y_1)+(x_2,y_2) \equiv (x_3,y_3) \ (\text{mod } p), \tag{30}$$

where, if $x_1 \neq x_2 \pmod p$, $$x_3 \equiv \left(\frac{u_1 - u_2}{x_1 - x_2}\right)^2 v - x_1 - x_2 \ (\text{mod } p) \tag{31}$$

$$y_3 \equiv \left(\left(\frac{u_1 - u_2}{x_1 - x_2}\right)(x_1 - x_3) - u_1\right)\sqrt{v} \ (\text{mod } p), \tag{32}$$

or, if $x_1 \equiv x_2$ and $y_1 \neq -y_2 \pmod p$, $$x_3 \equiv \left(\frac{3x_1^2 + a}{2u_1 v}\right)^2 v - x_1 - x_2 \ (\text{mod } p) \tag{33}$$

$$y_3 \equiv \left(\left(\frac{3x_1^2 + a}{2u_1 v}\right)(x_1 - x_3) - u_1\right)\sqrt{v} \ (\text{mod } p), \tag{34}$$

This demonstrates the closure property of the group in that a point $(x_3,y_3)$ in the group can be obtained from addition of two other points $(x_1, y_1)$ and $(x_2, y_2)$ in the group.

It also can be shown that other group axioms hold for the complementary group. The order of the complementary group is given by $$|\overline{E_p(a,b)}| = 1 + \sum_{x=1}^{p} \left(1 - \left(\frac{z}{p}\right)\right) \tag{35}$$

where (z|p) is the Legendre symbol and $z \neq x^3 + ax + b \pmod p$. Equation 35 follows because, for the complementary group, in addition to the point at infinity, for a given value of x:

1. There are two values of y that correspond to that value of x, if z is a quadratic non-residue modulo p;
2. There is one value of y that corresponds to that value of x, if $z \neq 0$ modulo p; and
3. There are no values of y that correspond to that value of x, if z is a quadratic residue.

If there are A values of x for which (z|p)=1, B values of x for which (z|p)=0 and C values of x for which (z|P)=−1 then, since x must be one of p possible values, because there are only p values of x which produce unique values of z.

$$A+B+C=p \tag{36}$$

From Equations 16 and 20

$$|E_p(a,b)| = 1 + 2A + B = 1 + p + \alpha, \tag{37}$$

$$2A + B = p + \alpha \tag{38}$$

Consequently, from Equations 35, 36 and 38, $$|\overline{E_p(a,b)}| = 1 + 2C + B = 1 + 2p - (2A+B) = 1 + p - \alpha \tag{39}$$

This establishes the order of the complementary group $|\overline{E_p(a,b)}|$ in terms of the parameters of the order of the standard group $|E_p(a,b)|$. A similar expression also holds for another large prime q. An encryption method can therefore be established using a fixed curve and obtaining points on the curve which may be in, for modulo n operations, one of four pairs of groups, the standard groups for both p and q, the complimentary groups for both p and q, the standard group for p and the complimentary group for q, or the standard group for q and the complimentary group for p. The two primes, p and q are randomly selected, together with parameters a and b which define the elliptic curve. The arithmetic modulus n=p.q is calculated, gcd $(4a^3+27b^2, n)=1$ is checked, and the order of the groups for primes p and q are as follows $|E_p(a,b)|=1+p+\alpha, |\overline{E_q(a,b)}|=1+p-\alpha, |E_q(a,b)|=1+q+\beta$ and $|\overline{Eq(a,b)}|=1+q-\beta$. The orders of these groups can then be calculated as discussed previously. The plaintext is represented by x and s represents the ciphertext, where $0 \leq x, s \leq n-1$.

Encryption is performed according to the following $$(s,t) \equiv (x,y) \# e (\text{mod } n) \tag{40}$$

and decryption is performed by $$(x,y) \equiv (s,t) \# d_i (\text{mod } n) \tag{41}$$

where $$e.d_i \equiv \pm 1 (\text{mod } N_i), i = 1 \text{ to } 4, \tag{42}$$

$$\gcd(e, N_i) = 1, i = 1 \text{ to } 4, \tag{43}$$

$$N_1 = 1 \text{ cm}(p + 1 + \alpha, q + 1 + \beta) \quad (44)$$

$$\text{if } \left(\frac{w}{p}\right) = 1 \text{ and } \left(\frac{w}{q}\right) = 1,$$

$$N_2 = 1 \text{ cm}(p + 1 + \alpha, q + 1 - \beta) \quad (45)$$

$$\text{if } \left(\frac{w}{p}\right) = 1 \text{ and } \left(\frac{w}{q}\right) \neq 1,$$

$$N_3 = 1 \text{ cm}(p + 1 - \alpha, q + 1 + \beta) \quad (46)$$

$$\text{if } \left(\frac{w}{p}\right) \neq 1 \text{ and } \left(\frac{w}{q}\right) = 1,$$

$$N_4 = 1 \text{ cm}(p + 1 - \alpha, q + 1 - \beta) \quad (47)$$

$$\text{if } \left(\frac{w}{p}\right) \neq 1 \text{ and } \left(\frac{w}{q}\right) \neq 1,$$

$$z \equiv x^3 + ax + b \pmod{n}, \quad (48)$$

$$y \equiv \sqrt{z} \pmod{n}, \quad (49)$$

$$w \equiv s^3 + as + b \pmod{n}, \text{ and} \quad (50)$$

$$t \equiv \sqrt{w} \pmod{n}. \quad (51)$$

The values of $N_i$ are determined by finding the lowest common multiple (1 cm) of the orders of the respective p and q groups. The encryption key e is randomly selected with the only qualification that the greatest common denominator of e and $N_i$, is 1. The parameters n, a, b and the encryption key e are made available to the public so that any plaintext x can be encrypted, whereas the decryption keys $d_i$ and the primes p and q are kept secret. The ciphertext s can only be decrypted by first using the Legendre symbols (w|p) and (w|q) to determine which pair of groups the ciphertext (s,t) is a member. Once this is determined, the appropriate $N_i$ can be used to determine the correct encryption key $d_i$ to be used which is derived using $e.d_i \equiv 1 \pmod{N_i}$.

If p, q, a and b are chosen so that $\alpha = \beta = 0$ in Equations 44 to 47, then $N_i = 1 \text{ cm } (p+1, q+1)$ is constant for all i=1 to 4. Consequently only one value of $d_i$ needs to be calculated and decryption is independent of Legendre symbols (w/p) and (w/q).

The decryption time can be reduced, by a factor of approximately 4, by performing the operation of Equation 41 in modulo p and modulo q and then combining the results using the Chinese Remainder Theorem.

The security of the scheme relies primarily on the inherent difficulty in factoring p and q from n which are required to derive appropriate decryption keys $d_i$, but the security is also enhanced by the fact that it is difficult to determine where the point (s,t) is on the elliptic curve and to which group it belongs because only the first coordinate s is calculated and transmitted.

Computation of the second coordinates y and t can also be avoided using the doubling algorithms discussed in D. M. Bressoud, Factorisation and Primality Testing, Springer-Verlag, New York, 1989. The algorithms are as follows.

In the elliptic group $E_p(a,b)$ (or $\overline{E_p(a,b)}$), let $(x_i, y_i) \equiv (x,y) \# i \pmod{p}$. If $y_i \neq 0 \pmod{p}$, then $$x_{2i} \equiv \frac{(x_i^2 - a)^2 - 8bx_i}{4(x_i^3 + ax_i + b)} \pmod{p} \quad (52)$$

In addition, if $x_i \neq x_{i+1}$ and $x \neq 0 \pmod{p}$, then $$x_{2i+1} \equiv \frac{(a - x_i x_{i+1})^2 - 4b(x_i + x_{i+1})}{x(x_i - x_{i+1})^2} \pmod{p} \quad (53)$$

Equation 53 cannot be used if $x \equiv 0$ modulo p (or q). However, the equation can be rearranged to give $$x_{2i+1} \equiv \frac{4b + 2(a - x_i x_{i+1})(x_i + x_{i+1})}{(x_i - x_{i+1})^2} - x \pmod{p} \quad (54)$$

which is valid for all $0 \leq x \leq p-1$ (and consequently for all $0 \leq x \leq n-1$ when computations are performed modulo n). The Equations 52 to 54 do not determine all of the points within an elliptic group but enable a sufficient number of the points to be derived to obtain the coordinate s dictated by the encryption key e.

It can be shown that $x_i$ is never congruent to $x_{i+1}$ modulo p (or q) during the course of computing $s \equiv x_e$ modulo n, as given by Equation 40. Similarly $s_i$ is never congruent to $s_{i+1}$ modulo p (or q) during the course of computing Equation 41. However, it is possible (although extremely unlikely) that $y_i$ may become congruent to 0 modulo p (or q) during the course of computations and therefore for Equation 52 to become undefined. However, homogeneous coordinates can be used which enable division to be avoided until the final stage of the encryption or decryption procedure.

Homogeneous coordinates are formed by setting $x \equiv X/Z \pmod{p}$ and $y \equiv Y/Z \pmod{p}$. If $(x_i, y_i) \equiv (X_i/Z_i, Y_i/Z_i) \equiv (X/Z, Y/Z) \# i \pmod{p}$, Equations 52 and 54 can be restated in the following form using modulo n arithmetic.

$$X_{2i} \equiv (X_i^2 - aZ_i^2)^2 - 8bX_iZ_i^{3\ 1} \pmod{n} \quad (55)$$

$$X_{2i} \equiv 4Z_i(X_i^3 + aX_iZ_i^2 + bZ_i^3) \pmod{n} \quad (56)$$

$$X_{2i+1} \equiv Z[4bZ_i^2 Z_{i+1}^2 + 2(aZ_iZ_{i+1} + X_iX_{i+1})(X_iZ_{i+1} + X_{i+1}Z_i)] \quad (57)$$
$$- X(x_iZ_{i+1} - X_{i+1}Z_i)^2 \pmod{n}$$

$$Z_{2i+1} \equiv Z(X_iZ_{i+1} - X_{i+1}Z_i)^2 \pmod{n} \quad (58)$$

Using the homogeneous coordinate notation discussed above, the encryption and decryption procedures can be restated as follows $$s \equiv x_e \equiv X_e/Z_e \pmod{n} \quad (59)$$

where X=x and Z=1, and $$x \equiv s_{di} \equiv S_{di}/Z_{di} \pmod{n} \quad (60)$$

where S=s, Z=1 and $d_i$ is as defined by Equations 42 to 51.

The above encryption method can be equally applied to producing digital by using the decryption key $d_i$ to produce the signatures as follows $$s \equiv X_{di}/Z_{di} \pmod{n} \quad (61)$$

where X=x is the message or plaintext, Z=1 and $d_i$ is as defined by Equations 42 to 51 with $z-x^3+ax+b \pmod{n}$ replacing w in Equations 44 to 47.

Signature verification is performed by computing:

$$x \equiv S_e/Z_e \pmod{n} \quad (62)$$

where S=s and Z=1.

The cryptographic method discussed above can also be applied to other number systems, such as Lucas sequences, that can be divided into similar pairs of cyclic groups where operations can be performed on the members of a pair of groups so as to generate members of the pair of groups from one member, including the initially selected member.

The cryptographic method discussed above has a number of significant advantages over previous methods, such as:

(i) The method can be used for both digital signature and encryption applications.

(ii) The message data does not need to be extended, i.e., the ciphertext and the plaintext are the same bit length.

(iii) Only the first coordinates of points on the elliptic curve need to be determined.

(iv) The method can be used for any values of p and q, greater than 3, and any values of a and b for which the order of the elliptic groups can be determined, provided gcd $(4a^3+27b^2, n)=1$.

(v) The parameters a and b remain fixed and are publicly known, therefore they do not have to be determined or calculated at either the sending or receiving terminals.

(vi) The method appears to be immune from homomorphic attack, i.e., new signatures cannot be created from a database of previously used signatures, one reason being that the second coordinate of the points on the elliptic curve are never calculated and it is difficult to add the first coordinates of two arbitrary points without knowing the corresponding second coordinates. Second coordinates can only be determined if p and q are known.

I claim:

1. A cryptographic method including:

selecting secret keys p and q, being prime numbers greater than 3;

selecting public parameters for a series of data values which belong to one of a plurality of pairs of groups whereby any one of said data values in one of said pairs of groups is recovered by performing an operation $kN_i+1$ times modulo n beginning with said any one of said data values, where k is an integer, $N_i$ is the order of the ith pair of groups and n=p.q;

selecting a public encryption key e which is a factor of $kN_i+1$ for all i; and processing communications data as a member of one of said pairs of groups by performing said operation on said communications data, whereby the order $N_i$ of the pair of groups i that said communications data belongs to can be determined on the basis of p and q, and a secret decryption key $d_i$ can be determined using $e.d_i = kN_i+1$.

2. A cryptographic method as claimed in claim 1, including encrypting message data having a data value x to obtain ciphertext s by performing said operation e times on x.

3. A cryptographic method as claimed in claim 1, including decrypting ciphertext having a data value s by determining which one of said pairs of groups s belongs to and $N_i$ and $d_i$ for said one of said pairs of groups on the basis of e, p, q and said public parameters, and performing said operation $d_i$ times on s.

4. A cryptographic method as claimed in claim 1, including obtaining a digital signature, on message data having a data value x by determining which one of said pairs of groups x belongs to and $N_i$ and $d_i$ for said one of said pairs of groups on the basis of e, p and q and said public parameters, and performing said operation $d_i$ times on x.

5. A cryptographic method as claimed in claim 1, including verifying a digital signature having a data value s by performing said operation e times to obtain plaintext.

6. A cryptographic method as claimed in claim 3, wherein only said ciphertext s, said public parameters and p and q are required to determine said one of said pairs of groups.

7. A cryptographic method as claimed in claim 4, wherein only said message data x, said public parameters and p and q are required to determine said one of said pairs of groups.

8. A cryptographic method as claimed in claim 1, wherein said pairs of groups include complementary groups which include indeterminate data values.

9. A cryptographic method as claimed in claim 1, wherein said parameters are parameters of curve and said data values represent points on said curve.

10. A cryptographic method as claimed in claim 9, wherein said curve is elliptic.

11. A cryptographic method as claimed in claim 10, wherein said curve includes said points (x,y) such that $$y^2 \equiv x^3+ax+b \pmod{n}$$

where a and b are said public parameters and gcd $(4a^3+27b^2, n)=1$, and said data values represent x coordinates.

12. A cryptographic method as claimed in claim 11, wherein said operation is a point multiplication on said curve denoted by the symbol #, such that $$(x,y)\#\{kN_i+1\} \equiv (x,y)\#e.d_i \equiv (x,y) \pmod{n}.$$

13. A cryptographic method as claimed in claim 12, wherein y may be indeterminate and equal $u\sqrt{v}$ where u is an integer and v is a fixed quadratic non-residue.

14. A cryptographic method as claimed in claim 13, wherein for a point (s,t) obtained by performing said operation on a point (x,y), (s,t) belongs to one of four of said pairs of groups, i equal to 1, 2, 3 or 4, where $e.d_i \equiv \pm 1 \pmod{N_i}$, $i = 1$ to $4$, $gcd(e, N_i) = 1$, $i = 1$ to $4$, $N_1 = 1\,\mathrm{cm}(p+1+\alpha, q+1+\beta)$ if $\left(\dfrac{w}{p}\right) = 1$ and $\left(\dfrac{w}{q}\right) = 1$, $N_2 = 1\,\mathrm{cm}(p+1+\alpha, q+1-\beta)$ if $\left(\dfrac{w}{p}\right) = 1$ and $\left(\dfrac{w}{q}\right) \neq 1$, $N_3 = 1\,\mathrm{cm}(p+1-\alpha, q+1+\beta)$ if $\left(\dfrac{w}{p}\right) \neq 1$ and $\left(\dfrac{w}{q}\right) = 1$ $N_4 = 1\,\mathrm{cm}(p+1-\alpha, q+1-\beta)$ if $\left(\dfrac{w}{p}\right) \neq 1$ and $\left(\dfrac{w}{q}\right) \neq 1$, $z \equiv x^3 + ax + b \pmod{n}$, $y \equiv \sqrt{z} \pmod{n}$, $w \equiv s^3 + as + b \pmod{n}$, and $t \equiv \sqrt{w} \pmod{n}$.

$\alpha$ and $\beta$ being constants such that let $|\alpha| \leq 2\sqrt{p}$ and $|\beta| \leq 2\sqrt{q}$ and $$\left(\frac{w}{p}\right) \text{ or } \left(\frac{w}{q}\right)$$

being the Legendre symbol, whereby said one of said pairs of groups has an order $N_1$, $N_2$, $N_3$ or $N_4$ and corresponding decryption key $d_1$, $d_2$, $d_3$ or $d_4$, respectively.

15. A cryptographic method as claimed in claim 14, including encrypting plaintext having a data value x to obtain ciphertext s by performing the following $$(s,t) \equiv (x,y) \# e \pmod{n}.$$

16. A cryptographic method as claimed in claim 14, including decrypting ciphertext having a data value s to obtain plaintext x by performing the following $$(x,y) \equiv (s,t) \# d_i \pmod{n}.$$

17. A cryptographic method as claimed in claim 14, including obtaining a digital signature having data value s on plaintext x by performing the following $$(s,t) \equiv (x,y) \# d_i \pmod{n}$$

and substituting z for w to determine $N_i$ and $d_i$.

18. A cryptographic method as claimed in claim 14, including verifying a digital signature having a data value s to obtain plaintext x by performing the following $$(x,y) \equiv (s,t) \# e \pmod{n}.$$

19. A cryptographic method as claimed in claim 14, wherein $x = X/Z \pmod{n}$ and $y = Y/Z \pmod{n}$ and $(x_j, y_j) \equiv (X_j/Z_j, Y_j, Z_j(X/Z, Y/Z) \# j \pmod{n}$, and points in said groups are obtained using the following $$X_{2j} \equiv (X_j^2 - aZ_j^2)^2 - 8bX_jZ_j^3 \pmod{n}$$

$$Z_{2j} \equiv 4Z_j(X_j^3 + aX_jZ_j^2 + bZ_j^3) \pmod{n}$$

$$X_{2j+1} \equiv Z[4bZ_j^2Z_{j+1}^2 + 2(aZ_jZ_{j+1} + X_jX_{j+1})(X_jZ_{j+1} + X_{j+1}Z_j)] - X(X_jZ_{j+1} - X_{j+1}Z_j)^2 \pmod{n}$$

$$Z_{2j+1} \equiv Z(X_jZ_{j+1} - X_{j+1}Z_j)^2 \pmod{n}.$$

20. A cryptographic method as claimed in claim 19, including encrypting plaintext having a data value x to obtain ciphertext s using the following $$s \equiv x_e \equiv X_e/Z_e \pmod{n}$$

where X=x and Z=1.

21. A cryptographic method as claimed in claim 19, including decrypting ciphertext having a data value s to obtain plaintext x using the following $$x \equiv s_{di}S_{di}Z_{di} \pmod{n}$$

where S=s, Z=1.

22. A cryptographic method as claimed in claim 19, including generating a digital signature having a data value s from plaintext x using the following $$s \equiv X_{di}/Z_{di} \pmod{n}$$

where X=x, Z=1 and to determine $N_i$ and $d_i$, z is substituted for w.

23. A cryptographic method as claimed in claim 19, including verifying a digital signature having a data value s to obtain plaintext x by performing the following:

$$x \equiv S_e/Z_e \pmod{n}$$

where S=s and Z=1.

* * * * *

UNITED STATES PATENT AND TRADEMARK OFFICE
CERTIFICATE OF CORRECTION

PATENT NO. : 5,627,893
DATED : May 6, 1997
INVENTOR(S) : Demytko, Nicholas

It is certified that error appears in the above-identified patent and that said Letters Patent is hereby corrected as shown below:

At column 2, lines 21-22, delete: "...$e.d_j = kN_j = 1.$" and insert: "...$e.d_j = kN_i = 1.$";

At column 4, line 1, delete: "...arc available..." and insert: "...are available...";

At column 7, line 8, delete: "$z \equiv y^z = (\mod n)$..." and insert: "$z \equiv y^z (\mod n)$...";

At column 10, line 54, delete: "...by using..." and insert: "...signatures by using...";

At column 13, lines 29-30, delete: "...$(x_j, y_j) \equiv (X_j/Z_j, Y_j, Z_j(X/Z, Y/Z)\#j(\mod n)$..." and insert "...$(x_j, y_j) = (X_j/Z_j, Y_j, Z_j) \equiv (X/Z, Y/Z)\#j(\mod n)$...";

At column 14, line 15, delete: "$x \equiv s_{di} S_{di} Z_{di} (\mod n)$" and insert: "$x \equiv s_{di} \equiv S_{di}/Z_{di} (\mod n)$".

Signed and Sealed this

Twenty-fifth Day of May, 1999

Attest:

Q. TODD DICKINSON

*Attesting Officer*     *Acting Commissioner of Patents and Trademarks*

UNITED STATES PATENT AND TRADEMARK OFFICE
CERTIFICATE OF CORRECTION

PATENT NO. : 5,627,893
DATED : May 6, 1997
INVENTOR(S) : Demyko, Nicholas

It is certified that error appears in the above-identified patent and that said Letters Patent is hereby corrected as shown below:

At column 2, lines 21-22, delete: "...e.d$_j$=kN$_i$=1." and insert: "...e.d$_i$ = kN$_i$+1.";

At column 13, lines 29-30, delete: "...(x$_j$, y$_j$)=(Xj/Zj, Yj, Zj)≡(X/Z, Y/Z)#j(mod n)..." and insert: --  --.

Signed and Sealed this

Fourteenth Day of March, 2000

Attest:

Q. TODD DICKINSON

*Attesting Officer*  *Commissioner of Patents and Trademarks*